T. H. THOMAS.
BRAKE VALVE DEVICE.
APPLICATION FILED JULY 11, 1919.
1,381,946.
Patented June 21, 1921.
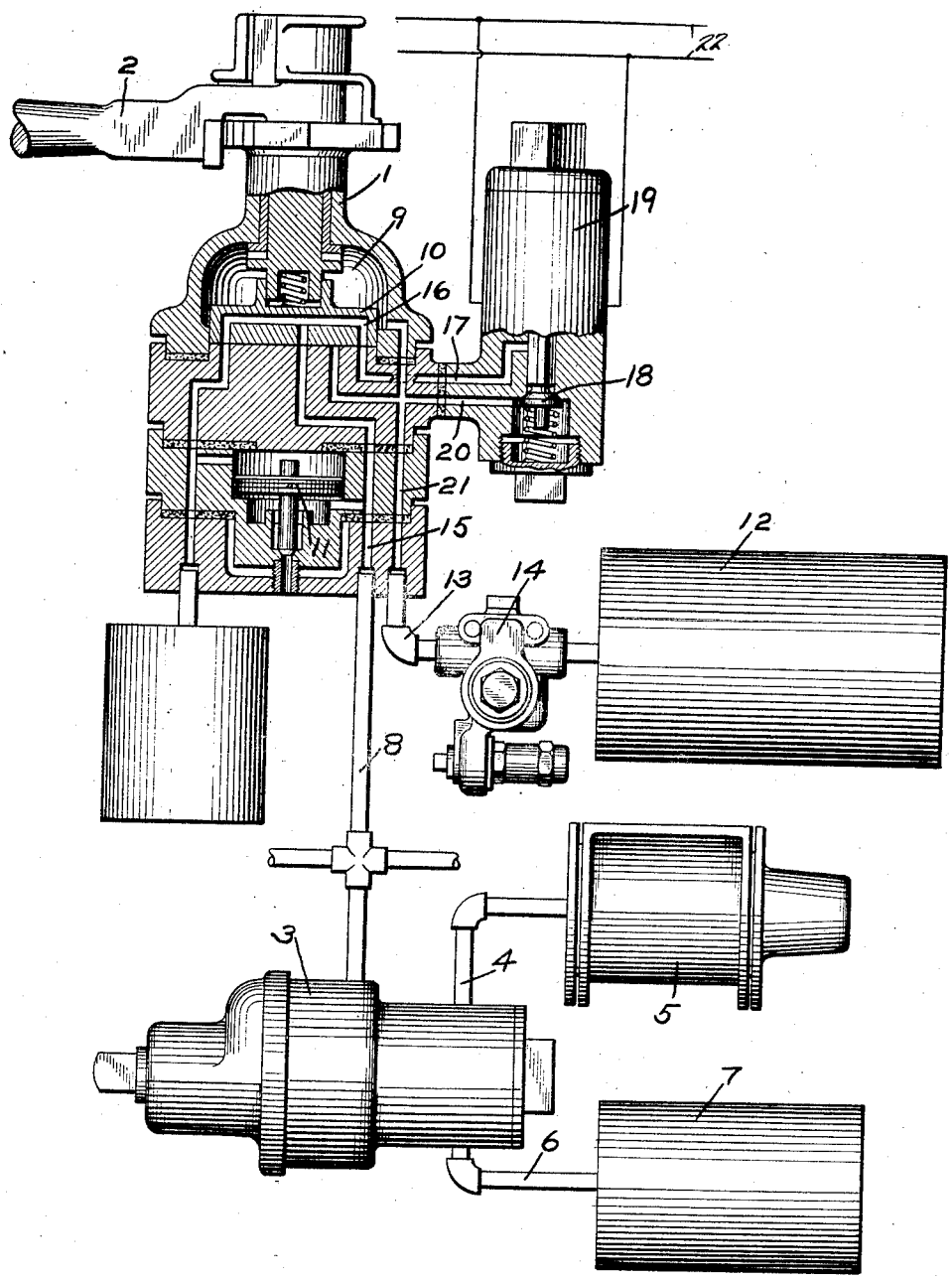
INVENTOR
Thomas H. Thomas
by Wm. M. Cady
Att'y.

UNITED STATES PATENT OFFICE.

THOMAS H. THOMAS, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA.

BRAKE-VALVE DEVICE.

1,381,946.     Specification of Letters Patent.     Patented June 21, 1921.

Application filed July 11, 1919. Serial No. 310,125.

*To all whom it may concern:*

Be it known that I, THOMAS H. THOMAS, a citizen of the United States, residing at Edgewood, in the county of Allegheny and State of Pennsylvania, have invented new and useful Improvements in Brake-Valve Devices, of which the following is a specification.

This invention relates to fluid pressure brakes, and more particularly to a brake equipment in which the brakes may be controlled either electrically or pneumatically.

It has heretofore been proposed to employ brake valves having means for controlling the brakes either electrically or pneumatically by the movement of the brake valve handle.

In some instances, the brake valve is provided with a holding position, in which fluid is supplied to the brake pipe to effect the recharge of the reservoirs throughout the train, while the brakes are held applied by the energization of the release magnets in this position of the brake valve. With equipments of the above character, the brakes are controlled electrically except when no electric current is available, and then the brakes are controlled pneumatically, but the engineer becoming accustomed to the use of the holding position when operating electrically, is apt to use this position when operating pneumatically.

If there is no current and the brakes are operated pneumatically, the release magnets throughout the train will of course not be energized in the holding position, with the result that if the engineer turns the brake valve handle to holding position, the brakes will be released when not intended.

The principal object of my invention is to overcome the above difficulty.

In the accompanying drawing, the single figure is a diagrammatic view, partly in section, of a brake equipment embodying my invention.

As shown in the drawing, the equipment may comprise a brake valve 1 adapted to control the brakes either pneumatically or electrically by the movement of the brake valve handle 2, although the electric control portion of the brake valve is not shown, since it is deemed unnecessary to a clear understanding of the present invention and since such combined brake valves and electric brake switches are well known in the art.

On each car there is provided a brake controlling valve device such as a triple valve device 3, connected by pipe 4 to brake cylinder 5, and by pipe 6 to auxiliary reservoir 7, the brake pipe 8 being connected to the triple valve device 3 for controlling the triple valve in the usual manner.

The brake valve device 1 may comprise a casing having a valve chamber 9 containing the usual rotary valve 10 adapted to be operated by handle 2 and containing the usual equalizing discharge valve mechanism 11.

Fluid under pressure is supplied from the main reservoir 12, through pipe 13 containing a pressure reducing valve 14, to the valve chamber 9.

In the drawing, the rotary valve 10 is shown in holding position, in which the brake pipe 8 is connected through passage 15, cavity 16 in rotary valve 10 with a passage 17 and according to my invention, flow of fluid from the main reservoir 12 to the brake pipe 8 is controlled by a valve 18 adapted to be operated by a magnet 19 in the electric brake controlling supply circuit.

If there is no current in the electric braking supply circuit the magnet 19 will be deenergized, and the valve 18 will then be operated to cut off communication between the passages 20 and 17, as shown in the drawing, so that in the holding position of the brake valve with no current flowing, the fluid will not be supplied from the main reservoir to the brake pipe.

When current is flowing in the brake supply circuit, the magnet 19 is energized and the valve 18 is thereby held open, so that fluid is supplied, in the holding position of the brake valve, from passage 20, leading to the main reservoir supply passage 21, past the valve 18 to passage 17, and thence through cavity 16 in the rotary valve 10 to passage 15 and the brake pipe 8.

It will therefore be evident that if the engineer is controlling the brakes pneumatically, and places the brake valve handle in holding position, when there is no current in the braking supply current, the brakes will not be released.

Having now described by invention, what I claim as new, and desire to secure by Letters Patent, is:—

1. The combination with a brake pipe, a source of fluid pressure, and a brake valve having a position for supplying fluid from the source of supply to the brake pipe, of an electric brake circuit and means operated when there is no current in the electric brake circuit for cutting off communication through which fluid is supplied from the source of pressure to the brake pipe.

2. The combination with a brake pipe, a source of fluid pressure, and a brake valve having a position for supplying fluid from the source of supply to the brake pipe, of an electric brake supply circuit, a magnet in said circuit, and a valve operated by said magnet, upon failure of current in the brake supply circuit, for closing communication through which fluid is supplied from the source of supply to the brake pipe.

3. The combination with a brake pipe, a main reservoir, and a brake valve having a holding position in which fluid is supplied from the main reservoir to the brake pipe, of an electric brake supply circuit, a magnet in said circuit, and a valve operated upon deenergization of said magnet for closing communication through which fluid is supplied from the main reservoir to the brake pipe.

In testimony whereof I have hereunto set my hand.

THOMAS H. THOMAS.